US012723288B2

(12) United States Patent
Morishige et al.

(10) Patent No.: US 12,723,288 B2
(45) Date of Patent: Sep. 1, 2026

(54) METHOD FOR PRODUCING GRAIN-ORIENTED ELECTRICAL STEEL SHEET

(71) Applicant: NIPPON STEEL CORPORATION, Tokyo (JP)

(72) Inventors: Nobusato Morishige, Tokyo (JP); Kazumi Mizukami, Tokyo (JP); Ryutaro Yamagata, Tokyo (JP); Takashi Kataoka, Tokyo (JP); Haruhiko Atsumi, Tokyo (JP); Daisuke Itabashi, Tokyo (JP); Junichi Takaobushi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 651 days.

(21) Appl. No.: 18/009,919

(22) PCT Filed: Jun. 23, 2021

(86) PCT No.: PCT/JP2021/023783

§ 371 (c)(1),
(2) Date: Dec. 12, 2022

(87) PCT Pub. No.: WO2021/261517

PCT Pub. Date: Dec. 30, 2021

(65) Prior Publication Data

US 2023/0243013 A1 Aug. 3, 2023

(30) Foreign Application Priority Data

Jun. 24, 2020 (JP) ................................ 2020-108621
Jun. 24, 2020 (JP) ................................ 2020-108645

(51) Int. Cl.

| | |
|---|---|
| *C21D 9/46* | (2006.01) |
| *C21D 8/12* | (2026.01) |
| *C21D 8/1216* | (2026.01) |
| *C21D 8/1244* | (2026.01) |
| *C21D 8/1277* | (2026.01) |
| *C22C 38/00* | (2006.01) |
| *C22C 38/02* | (2006.01) |
| *C22C 38/04* | (2006.01) |
| *C22C 38/06* | (2006.01) |
| *C22C 38/60* | (2006.01) |
| *H01F 1/147* | (2006.01) |
| *H01F 41/00* | (2006.01) |

(52) U.S. Cl.

CPC ............ *C21D 9/46* (2013.01); *C21D 8/1222* (2013.01); *C21D 8/1233* (2013.01); *C21D 8/1255* (2013.01); *C21D 8/1261* (2013.01); *C21D 8/1272* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *H01F 1/14775* (2013.01); *H01F 41/00* (2013.01); *C21D 2201/05* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 3,932,234 | A | 1/1976 | Imanaka et al. | |
| 5,554,235 | A | 9/1996 | Noe et al. | |
| 2006/0076086 | A1 | 4/2006 | Terashima et al. | |
| 2015/0243419 | A1 | 8/2015 | Senda et al. | |
| 2019/0271054 | A1 | 9/2019 | Ehashi et al. | |
| 2021/0017619 | A1 * | 1/2021 | Morishige ................ | C23G 1/08 |
| 2023/0243010 | A1 * | 8/2023 | Kataoka ................. | C22C 38/16 148/111 |

FOREIGN PATENT DOCUMENTS

| | | | |
|---|---|---|---|
| CN | 108699621 | A | 10/2018 |
| JP | 40-15644 | B2 | 7/1965 |
| JP | 51-13469 | B2 | 4/1976 |
| JP | 59-159989 | A | 9/1984 |

(Continued)

OTHER PUBLICATIONS

English translation of the Russian Office Action for corresponding Russian Application No. 2022133878/05, dated Jun. 22, 2023.

Gulyaev A.P., "Metallurgy, M.," Metallurgy, 1986, p. 10 and pp. 88-99.

Kuznetsov S.A., "Big Explanatory Dictionary of the Russian Language," Norint, St. Petersburg, 1998, p. 1249.

Sorokin V.G., "Steels and alloys, M."; Intermet Engineering, 2001, p. 10.

(Continued)

*Primary Examiner* — Xiaowei Su

(74) *Attorney, Agent, or Firm* — Birch, Stewart, Kolasch & Birch, LLP

(57) ABSTRACT

A new and improved method for producing grain-oriented electrical steel sheet enabling production of grain-oriented electrical steel sheet realizing high magnetic flux density and excellent in magnetic characteristics, that is, as one aspect, a method for producing grain-oriented electrical steel sheet comprising a hot rolling process, cold rolling process, primary recrystallization annealing process, finish annealing process, and flattening annealing process, wherein shot blasting treatment and/or leveling treatment and treatment for contact with a solution are performed, the solution contains Cu etc. in a predetermined amount, the pH is −1.5 or more and less than 7, a solution temperature is 15° C. or more and 100° C. or less, and the time during which the steel sheet is dipped in the solution is 5 seconds or more and 200 seconds or less.

10 Claims, No Drawings

(56) References Cited

FOREIGN PATENT DOCUMENTS

| | | | | | |
|---|---|---|---|---|---|
| JP | 63-315521 | A | | 12/1988 | |
| JP | 3-6389 | A | | 1/1991 | |
| JP | 6-212274 | A | | 8/1994 | |
| JP | 7-268567 | A | | 10/1995 | |
| JP | 2000-282271 | A | | 10/2000 | |
| JP | 2002-1415 | A | | 1/2002 | |
| JP | 2003-193141 | A | | 7/2003 | |
| JP | 2004-169179 | A | | 6/2004 | |
| JP | 2014-196559 | A | | 10/2014 | |
| JP | 2016-156068 | A | | 9/2016 | |
| JP | 2019-99827 | A | | 6/2019 | |
| JP | 2019-163516 | A | | 9/2019 | |
| JP | 2019-167568 | A | | 10/2019 | |
| JP | 2020-59050 | A | | 4/2020 | |
| JP | 2020-69507 | A | | 5/2020 | |
| WO | WO 2014/049770 | A1 | | 4/2014 | |
| WO | WO-2019181952 | A1 | * | 9/2019 | ......... H01F 1/14783 |

* cited by examiner

METHOD FOR PRODUCING GRAIN-ORIENTED ELECTRICAL STEEL SHEET

FIELD

The present invention relates to a method for producing grain-oriented electrical steel sheet.

BACKGROUND

Grain-oriented electrical steel sheet is steel sheet which contains Si in 2 mass % to 5 mass % or so and has crystal grains of the steel sheet integrated in orientation to a high degree to the {110}<001> orientation called the “Goss orientation”. Grain-oriented electrical steel sheet is excellent in magnetic characteristics and, for example, is utilized as the core material of transformers and other stationary induction apparatus etc.

In such grain-oriented electrical steel sheet, various techniques have been developed for improving the magnetic characteristics. In particular, along with the demands for energy-saving in recent years, further reduction of the core loss has been sought in grain-oriented electrical steel sheet. For reducing the core loss of grain-oriented electrical steel sheet, raising the degree of integration of the orientation of the crystal grains of the steel sheet to the Goss orientation to improve the magnetic flux density and reduce the hysteresis loss is effective.

Here, in the production of grain-oriented electrical steel sheet, the crystal orientation is controlled by utilizing the catastrophic grain growth phenomenon called “secondary recrystallization”. However, to suitably control the crystal orientation by secondary recrystallization, it is important to improve the heat resistance of the microprecipitates in the steel called “inhibitors”.

For example, the method of making the inhibitors completely dissolve at the time of heating the steel slab before hot rolling, then making them finely precipitate in the hot rolling and later annealing process may be mentioned. Specifically, the method such as illustrated in the following PTL 1 of using MnS and AlN as inhibitors and rolling by a rolling reduction rate of more than 80% in the final cold rolling process or the method such as illustrated in the following PTL 2 of using MnS and MnSe as inhibitors and performing a cold rolling process two times may be mentioned.

Further, PTLs 3 and 4 disclose the art of controlling the conditions of the hot rolled annealing and pickling treatment conditions to produce grain-oriented electrical steel sheet excellent in coating characteristics. Furthermore, PTL 5 discloses the art of controlling the pickling treatment conditions, additive conditions of annealing separators, and finish annealing conditions to produce grain-oriented electrical steel excellent in coating characteristics. PTL 6 discloses the art of controlling carbides by heat treatment before cold rolling to produce grain-oriented electrical steel sheet excellent in magnetic characteristics. Furthermore, PTL 7 discloses the art of controlling the temperature raising process in primary recrystallization annealing and introducing microstrain during the temperature raising process to thereby produce grain-oriented electrical steel excellent in magnetic characteristics.

Further, the following PTL 8 discloses the art of controlling the heat pattern in the temperature raising process in primary recrystallization annealing to produce grain-oriented electrical steel sheet lowered in core loss over the entire length of the coil. Furthermore, the following PTL 9 discloses the art of strictly controlling the average grain size of the crystal grains after secondary recrystallization and the angle of deviation from the ideal orientation to reduce the core loss of grain-oriented electrical steel sheet.

CITATIONS LIST

Patent Literature

[PTL 1] Japanese Examined Patent Publication No. 40-15644b

[PTL 2] Japanese Examined Patent Publication No. 51-13469

[PTL 3] Japanese Unexamined Patent Publication No. 2019-99827

[PTL 4] Japanese Unexamined Patent Publication No. 2003-193141

[PTL 5] Japanese Unexamined Patent Publication No. 2014-196559

[PTL 6] Japanese Unexamined Patent Publication No. 2016-156068

[PTL 7] Japanese Unexamined Patent Publication No. 6-212274

[PTL 8] WO2014/049770

[PTL 9] Japanese Unexamined Patent Publication No. 7-268567

SUMMARY

Technical Problem

Along with the increasing global regulation of the efficiency of transformers, demand for reduction of core loss in grain-oriented electrical steel sheet has grown much larger. On the other hand, transformers are important equipment supporting social infrastructure over the long term, so continued stable operation is important. For this reason, greater reliability contributing to stabler operation of transformers is being sought from the grain-oriented electrical steel sheet forming the main members. In particular, uniform appearance of grain-oriented electrical steel sheet free from uneven color etc. has become an important element in obtaining trust from users.

The above-mentioned PTLs 3 to 5 disclose art creating a difference in concentration of Mn or Cu at the surface of steel sheet and center of sheet thickness to improve the coating film adhesion. However, the art of causing concentration of a specific constituent at the surface of steel sheet is art aiming at only improvement of the coating characteristics. Art for stably obtaining excellent magnetic characteristics was not studied.

The above-mentioned PTL 6 promotes a change from cementite to graphite by heat treatment before cold rolling to improve the texture obtained by the subsequent primary recrystallization. However, the temperature raising process in primary recrystallization annealing and the pickling are based on the conventional methods and are not newly studied.

Further, as disclosed in the above-mentioned PTL 7, it is confirmed that the magnetic characteristics of the grain-oriented electrical steel sheet are greatly affected by rapidly raising the temperature to a temperature of 700° C. or more by 100° C./s or more in the temperature raising process in primary recrystallization annealing and introducing microstrain of a nominal strain of 0.1% or more during this rapid heating. Further, in the above-mentioned PTL 8, it is confirmed that the magnetic characteristics of the grain-oriented electrical steel sheet are greatly affected by rapidly raising the temperature to between 500° C. to 600° C. by 100° C./s or more in the temperature raising process in primary recrystallization annealing. The above-mentioned PTL 9 discloses setting the temperature of temperature rise to 850° C. by 300° C./s or 450° C./s in the temperature raising process of the primary recrystallization annealing.

However, in the above-mentioned PTLs 7 to 9, what kind of affect there is on the magnetic characteristics of grain-oriented electrical steel sheet if making the inhibitors change in the thickness direction of steel sheet was not studied in detail.

Therefore, the present invention was made in consideration of the above problem. An object of the present invention is to provide a new and improved method for producing grain-oriented electrical steel sheet enabling production of grain-oriented electrical steel sheet realizing high magnetic flux density and excellent in magnetic characteristics.

Solution to Problem

To solve the above problem, according to one aspect of the present invention, there is provided a method for producing grain-oriented electrical steel sheet comprising a process of heating and hot rolling a slab containing, by mass %, C: 0.01% or more and 0.10% or less, Si: 2.5% or more and 4.5% or less, Mn: 0.01% or more and 0.50% or less, a total of one or more of S, Se, and Te: 0.001% or more and 0.050% or less, acid soluble Al: more than 0% and 0.05% or less, and N: more than 0% and 0.015% or less and having a balance of Fe and impurities to obtain a hot rolled steel sheet or annealing the hot rolled steel sheet to obtain a hot rolled annealed sheet, a process of cold rolling the hot rolled steel sheet or the hot rolled annealed sheet to obtain a cold rolled steel sheet, a process of annealing the cold rolled steel sheet for primary recrystallization to obtain a primary recrystallized annealed sheet, a process of coating a surface of the primary recrystallized annealed sheet by an annealing separator including MgO, then finish annealing it to obtain a finish annealed sheet, at least one steel sheet among the hot rolled steel sheet, the hot rolled annealed sheet, the cold rolled steel sheet, and the primary recrystallized annealed sheet being treated by shot blasting and treated by contact with a solution, and a process of coating the finish annealed sheet with an insulation coating, then annealing it for flattening, in the shot blasting treatment, an average particle size of the shot material being 0.1 mm or more and 5.0 mm or less and a shot speed being 10 m/s or more and 150 m/s or less, the solution containing one or more elements from among Cu, Hg, Ag, Pb, Cd, Co, Zn, and Ni, having a total concentration of the elements of 0.00001% or more and 1.0000% or less, having a pH of −1.5 or more and less than 7, and having a solution temperature of 15° C. or more and 100° C. or less, the time during which the steel sheet is dipped in the solution being 5 seconds or more and 200 seconds or less.

Further, according to another aspect of the present invention, there is provided a method for producing grain-oriented electrical steel sheet wherein leveling treatment may be performed instead of the above-mentioned shot blasting treatment or in addition to the shot blasting treatment, in the leveling treatment, the number of bending operations of the hot rolled steel sheet being two or more, a bending angle being 10 degrees or more and 90 degrees or less, and a bending radius being 10 mm or more and 200 mm or less.

Furthermore, according to another aspect of the present invention, there is provided a method for producing grain-oriented electrical steel sheet wherein in the rapid temperature rise of the primary recrystallization annealing, an average rate of temperature rise in the temperature region of 550° C. to 700° C. is 100° C./s or more and 3000° C./s or less.

Furthermore, according to another aspect of the present invention, there is provided a method for producing grain-oriented electrical steel sheet wherein the slab contains, in place of part of the Fe, one or more elements selected from the group comprising Cu: 1.0% or less, Sn: 1.0% or less, Ni: 1.0% or less, Cr: 1.0% or less, Sb: 1.0% or less, and Bi: 1.0% or less.

Furthermore, according to another aspect of the present invention, there is provided a method for producing grain-oriented electrical steel sheet wherein the primary recrystallization annealing includes a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

Advantageous Effects of Invention

According to the present invention, a solution containing one or more elements from among Cu, Hg, Ag, Pb, Cd, Co, Zn, and Ni (in this Description, these will sometimes be referred to as "Cu etc.") and the electrical steel sheet are made to contact each other. The electrical steel sheet includes MnS, MnSe, and MnTe as precipitates (in this Description, these will sometimes be referred to as "MnS etc.") MnS and other precipitates act as inhibitors. In the present invention, if MnS etc. contact a solution containing Cu etc., part of the Mn at the MnS etc., in particular the Mn of the surface layers of MnS etc., is substituted by Cu etc. By utilizing this phenomenon to improve the heat resistance of the precipitates, it is possible to improve the inhibitor strength of the grain-oriented electrical steel sheet. Due to this mechanism of action, it is possible to provide a new and improved method for producing grain-oriented electrical steel sheet enabling production of grain-oriented electrical steel sheet realizing high magnetic flux density and excellent in magnetic characteristics.

According to another aspect of the present invention, it is possible to further raise the magnetic flux density by combination of the art of increasing the Goss oriented grains near the surface layer by rapid heat treatment in the temperature raising process in the primary recrystallization annealing.

Further, according to another aspect of the present invention, it is possible to further raise the magnetic flux density by adding additional elements to the slab to stabilize the secondary recrystallization.

Furthermore, the inventors discovered that the phenomenon of substitution of the Mn of the surface layer of the MnS etc. by Cu etc. sometimes causes uneven color of the final product, but can be resolved by controlling the atmospheric and temperature conditions in the intermediate treatment and the atmospheric conditions in the decarburization annealing in the primary recrystallization annealing (rapid heat treatment and intermediate treatment and decarburization annealing). Based on this discovery, it is possible to suppress uneven color by another aspect of the present invention.

DESCRIPTION OF EMBODIMENTS

Below, preferred embodiments of the present invention will be explained in detail. Note that, unless otherwise indicated, the expression "A to B" for the numerical values A and B will mean "A or more and B or less". If assigning units to only the numerical value B in such an expression, the units shall also apply to the numerical value A.

Method for Producing Grain-Oriented Electrical Steel Sheet

The inventors discovered the following as a result of intensive study of the method for producing grain-oriented electrical steel sheet for improving the magnetic characteristics of grain-oriented electrical steel sheet.

Specifically, the inventors discovered that if making electrical steel sheet including MnS etc. contact a solution containing Cu etc. to improve the heat resistance of the MnS etc., part of the Mn at the MnS etc., in particular the Mn of the surface layers of the MnS etc., is substituted with Cu etc. and by making use of this phenomenon, it is possible to improve the inhibitor strength and improve the magnetic characteristics. In addition, they discovered that it is possible to improve the magnetic characteristics more by modifying the pretreatment of the shot blasting treatment or leveling treatment so to control the inhibitors in the thickness direction of the steel sheet when bringing the solution into contact with the sheet.

Furthermore, they discovered that by increasing the Goss oriented grains in the vicinity of the surface layer by rapid heat treatment in the temperature raising process in the primary recrystallization annealing, it is possible to further improve the magnetic characteristics.

Further, they discovered that by adding additional elements to the slab to stabilize secondary crystallization, it is possible to further improve the magnetic characteristics.

Furthermore, they discovered that the phenomenon of the Mn of the surface layers of the MnS etc. being substituted with Cu etc. sometimes causes uneven color of the final product, but this can be eliminated by controlling and improving the atmospheric and temperature conditions in the intermediate treatment and the atmospheric conditions in the decarburization annealing in the primary recrystallization annealing (rapid heat treatment and intermediate treatment and decarburization annealing).

The inventors considered the above discoveries and came up with the present invention. An embodiment of the present invention is a method for producing grain-oriented electrical steel sheet provided with the following constitution.

a process of heating and hot rolling a slab containing, by mass %, C: 0.01% or more and 0.10% or less, Si: 2.5% or more and 4.5% or less, Mn: 0.01% or more and 0.50% or less, a total of one or more of S, Se, and Te: 0.001% or more and 0.050% or less, acid soluble Al: more than 0% and 0.05% or less, and N: more than 0% and 0.015% or less and having a balance of Fe and impurities to obtain a hot rolled steel sheet or annealing the hot rolled steel sheet to obtain a hot rolled annealed sheet, a process of cold rolling the hot rolled steel sheet or the hot rolled annealed sheet to obtain a cold rolled steel sheet, a process of annealing the cold rolled steel sheet for primary recrystallization to obtain a primary recrystallized annealed sheet, a process of coating a surface of the primary recrystallized annealed sheet by an annealing separator including MgO, then finish annealing it to obtain a finish annealed sheet, a process of coating the finish annealed sheet with an insulation coating, then annealing it for flattening, at least one steel sheet among the hot rolled steel sheet, the hot rolled annealed sheet, the cold rolled steel sheet, and the primary recrystallized annealed sheet being treated by shot blasting and treated by contact with a solution, and in the shot blasting treatment, an average particle size of the shot material being 0.1 mm or more and 5.0 mm or less and a shot speed being 10 m/s or more and 150 m/s or less, the solution containing one or more elements from among Cu, Hg, Ag, Pb, Cd, Co, Zn, and Ni, having a total concentration of the elements of 0.00001% or more and 1.0000% or less, having a pH of −1.5 or more and less than 7, and having a solution temperature of 15° C. or more and 100° C. or less, the time during which the steel sheet is dipped in the solution being 5 seconds or more and 200 seconds or less.

It is also possible to perform leveling treatment instead of the above-mentioned shot blasting treatment or in addition to the shot blasting treatment. In the leveling treatment, the number of bending operations of the steel sheet is two or more, the bending angle is 10 degrees or more and 90 degrees or less, and the bending radius is 10 mm or more and 200 mm or less.

Furthermore, the temperature raising process in the primary recrystallization annealing may be made a rapid temperature rise as well. In the rapid temperature rise, the average rate of temperature rise of the temperature region of 550° C. to 700° C. is 100° C./s or more and 3000° C./s or less.

Further, the primary recrystallization annealing may also include a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

Below, the method for producing the grain-oriented electrical steel sheet according to the present embodiment will be specifically explained.

Chemical Composition of Slab

First, the chemical composition of the slab used for the grain-oriented electrical steel sheet according to the present embodiment will be explained. Note that, below, unless otherwise indicated, the expression "%" will be assumed to express "mass %". Further, the balance of the slab other than the elements explained below consists of Fe and impurities. Here, "impurities" indicate constituents contained in the raw materials or constituents entering in the process of production which are not intentionally contained in the steel sheet. Further, the chemical composition of the slab of the material of the grain-oriented electrical steel sheet is basically based on the composition of the grain-oriented electrical steel sheet. However, in the production of general grain-oriented electrical steel sheet, part of the contained elements is discharged outside of the system due to the decarburization annealing and purification annealing in the production process, so the chemical composition of the material slab and the final product grain-oriented electrical steel sheet becomes different. The slab composition can be suitably adjusted considering the effects of the decarburization annealing and purification annealing in the production process so that the characteristics of the grain-oriented electrical steel sheet become the desired ones.

The content of C (carbon) is 0.01% or more and 0.10% or less. C plays various roles, but if the content of C is less than 0.01%, at the time of heating the slab, the grain size becomes excessively large, whereby the core loss value of the final grain-oriented electrical steel sheet is made to increase, so this is not preferable. If the content of C is more than 0.10%, at the time of decarburization after cold rolling, the decarburization time becomes long and the production costs increase, so this is not preferable. Further, if the content of C is more than 0.10%, the decarburization easily becomes incomplete and there is a possibility of magnetic aging occurring in the final grain-oriented electrical steel sheet, so this is not preferable. Therefore, the content of C is 0.01% or more and 0.10% or less, preferably 0.05% or more and 0.09% or less.

The content of Si (silicon) is 2.5% or more and 4.5% or less. Si raises the electrical resistance of the steel sheet to thereby reduce the eddy current loss—one of the causes of core loss. If the content of Si is less than 2.5%, it becomes difficult to sufficiently suppress the eddy current loss of the final grain-oriented electrical steel sheet, so this is not preferable. If the content of Si is more than 4.5%, the workability of the grain-oriented electrical steel sheet falls, so this is not preferable. Therefore, the content of Si is 2.5% or more and 4.5% or less, preferably 2.7% or more and 4.0% or less.

The content of Mn (manganese) is 0.01% or more and 0.50% or less. Mn forms the inhibitors MnS, MnSe, MnTe, etc. governing the secondary recrystallization. If the content of Mn is less than 0.01%, the absolute amounts of MnS, MnSe, and MnTe causing the secondary recrystallization become insufficient, so this is not preferable. If the content of Mn is more than 0.50%, at the time of slab heating, the Mn becomes difficult to dissolve, so this is not preferable. Further, if the content of Mn is more than 0.15%, the precipitated size of the inhibitors MnS, MnSe, and MnTe easily becomes coarser and the optimal distribution of size as inhibitors is detracted from, so this is not preferable. Therefore, the content of Mn is 0.01% or more and 0.50% or less, preferably 0.01% or more and 0.30% or less, more preferably 0.03% or more and 0.15% or less.

The total content of the one or more elements from among S (sulfur), Se (selenium), and Te is a total of 0.001% or more and 0.050% or less. S, Se, and Te form inhibitors together with the above-mentioned Mn. Two or more of S, Se, and Te may be included in the slab, but it is sufficient that at least one of any of them be contained in the slab. If the total of the contents of S, Se, and Te is outside the above range, a sufficient inhibitor effect cannot be obtained, so this is not preferable. Therefore, the contents of S, Se, and Te are a total of 0.001% or more and 0.050% or less, preferably 0.002% or more and 0.040% or less.

The content of acid soluble Al (acid soluble aluminum) is more than 0% and 0.05% or less. The acid soluble Al forms the inhibitors required for producing high magnetic flux density grain-oriented electrical steel sheet. If the content of acid soluble Al is 0, sometimes no AlN is present, the inhibitor strength becomes insufficient, and good magnetic characteristics cannot be obtained, so this is not preferable. If the content of acid soluble Al is more than 0.05%, the AlN precipitating as inhibitors becomes coarser and causes the inhibitor strength to drop, so this is not preferable. Therefore, the content of acid soluble Al is more than 0% and 0.05% or less, preferably more than 0% and 0.04% or less.

The content of N (nitrogen) is more than 0% and 0.015% or less. N forms the inhibitor AlN together with the above-mentioned acid soluble Al. If the content of N is outside the above range, a sufficient inhibitor effect cannot be obtained, so this is not preferable. Therefore, the content of N is more than 0% and 0.015% or less, preferably more than 0% and 0.012% or less.

P (phosphorus) may be contained in more than 0% and 1.0% or less. P has the action of raising the strength without causing a drop in the magnetic flux density. However, if causing P to be excessively contained, the toughness of the steel becomes impaired and the steel sheet easily breaks. For this reason, the upper limit of the amount of P is made 1.0%. Preferably it is 0.150% or less, more preferably 0.120% or less. The lower limit of the amount of P is not particularly limited, but if considering the production costs, it becomes 0.001% or more.

Further, the slab used for the production of the grain-oriented electrical steel sheet according to the present embodiment may contain one or more elements of any of Cu, Sn, Ni, Cr, Sb, or Bi as elements stabilizing the secondary recrystallization in addition to the above-mentioned elements. If the slab contains the above elements, the magnetic flux density of the grain-oriented electrical steel sheet produced can be further improved.

The slab is formed by casting molten steel adjusted to the chemical composition explained above. Note that, the method of casting the slab is not particularly limited. Further, in R&D, even if a steel ingot is formed by a vacuum melting furnace etc., a similar effect as the case where the slab is formed for the above constituents can be confirmed.

Process for Forming Hot Rolled Steel Sheet

Next, the slab is heated and hot rolled to work it into a hot rolled steel sheet. The slab heating temperature is not particularly limited. If making the inhibitor constituents in the slab completely dissolve, for example, it may be heated to 1280° C. or more. Note that, the upper limit value of the heating temperature of the slab at this time is not particularly prescribed, but from the viewpoint of protection of the facilities, 1450° C. is preferable. For example, the heating temperature of the slab may be 1280° C. or more and 1450° C. or less. On the other hand, if not making the inhibitor constituents in the slab completely dissolve, for example, the heating temperature of the slab may be less than 1280° C. In this case, in the hot rolling process or any process from the hot rolled annealing process to the finish annealing process, the steel sheet may also be nitrided.

Next, the heated slab is hot rolled to work it to a hot rolled steel sheet. The thickness of the worked hot rolled steel sheet may, for example, be 1.8 mm or more and 3.5 mm or less. If the thickness of the hot rolled steel sheet is less than 1.8 mm, sometimes the shape of the steel sheet after hot rolling becomes poor, so this is not preferable. If the thickness of the hot rolled steel sheet is more than 3.5 mm, the rolling load in the process of cold rolling becomes larger, so this is not preferable.

The hot rolled steel sheet may also be annealed to obtain a hot rolled annealed sheet. If annealing the hot rolled sheet, the shape of the steel sheet becomes better, so it is possible to reduce the possibility of the steel sheet breaking in the later cold rolling.

Process for Forming Cold Rolled Steel Sheet

Next, the obtained hot rolled steel sheet or hot rolled annealed sheet is worked into a cold rolled sheet by a single cold rolling operation or several cold rolling operations with process annealing interposed. Note that, if rolling by a plurality of cold rolling operations with process annealing and/or pickling interposed, it is also possible to omit the previous stage hot rolled annealing. From the viewpoint of decreasing roll wear in cold rolling, pickling treatment is preferably performed before the individual cold rolling processes. Further, both hot rolled annealing and process annealing may be performed.

Further, the steel sheet may be heat treated at 300° C. or so or less between passes of cold rolling, between rolling stands, or during rolling. In such a case, the magnetic characteristics of the final grain-oriented electrical steel sheet can be improved. Note that, the hot rolled steel sheet may be rolled by cold rolling three times or more, but a large number of cold rolling operations increases the production costs, so the hot rolled steel sheet is preferably rolled by one or two cold rolling operations. If performing the cold rolling by Sendzimir or other reverse rolling, the number of passes in the cold rolling operations is not particularly limited, but from the viewpoint of production costs, nine passes or less is preferable.

Process for Primary Recrystallization Annealing

Next, the cold rolled steel sheet is raised in temperature, then annealed for decarburization. These processes are called "primary recrystallization annealing" and are preferably performed consecutively. The temperature rise of the primary recrystallization annealing can be made a rapid temperature rise whereby, in a cold rolled steel sheet, it becomes possible to increase the Goss oriented grains before the secondary recrystallization and, in the secondary recrystallization process, the oriented grains closer to the ideal Goss orientation recrystallize secondarily.

Temperature Raising Process

In the present invention, in the temperature raising process in the primary recrystallization annealing, the average rate of temperature rise from 550° C. to 700° C. may be made a rapid one of 100° C./s or more and 3000° C./s or less. Due to this, it is possible to increase the Goss oriented grains before secondary recrystallization of the cold rolled steel sheet and possible to improve the magnetic flux density of the final grain-oriented electrical steel sheet. The temperature range of the rapid temperature rise is 550° C. to 700° C. If the start temperature of the rapid temperature rise is more than 550° C., the recovery of the dislocations in the steel sheet greatly proceeds and the primary recrystallization of the oriented grains other than the Goss oriented grains ends up starting, so the effect of increasing the Goss oriented grains is decreased, therefore this is not preferable. If the end temperature of the rapid temperature rise is less than 700° C., the primary recrystallization of the other oriented grains ends up finishing before the primary recrystallization of the Goss oriented grains finishes, so the effect of increasing the Goss oriented grains is decreased, therefore this is not preferable.

Further, if making the average rate of temperature rise from 550° C. to 700° C. 400° C./s or more, it is possible to further increase the Goss oriented grains before the secondary recrystallization and further improve the magnetic flux density of the final grain-oriented electrical steel sheet, so this is more preferable. If making the average rate of temperature rise from 550° C. to 700° C. 700° C./s or more, it is possible to better improve the magnetic flux density of the grain-oriented electrical steel sheet, so this is very preferable. If the average rate of temperature rise from 550° C. to 700° C. is less than 100° C./s, sufficient Goss oriented grains for improving the magnetic characteristics are not obtained by secondary recrystallization, so this is not preferable. On the other hand, the upper limit of the average rate of temperature rise from 550° C. to 700° C. is not particularly prescribed, but from the viewpoint of the facilities and production costs, for example it may be made 3000° C./s. Note that, the start temperature of temperature rise of the primary recrystallization annealing and the heat pattern and peak temperature other than the rapid temperature rise from 550° C. to 700° C. are not particularly limited.

The rise in the inhibitor strength at the surface layer side of the steel sheet and a certain range of depth of the surface layer of the steel sheet due to the treatment making a solution contact the steel sheet (solution contact treatment) explained later and the increase in the Goss oriented grains due to the rapid temperature rise in the primary recrystallization annealing have a synergistic effect on improvement of the magnetic characteristics. As this mechanism, it may be that the inhibitor strength rises, so in the finish annealing temperature raising process, abnormal grain growth other than the Goss oriented grains in the vicinity of the surface layer is suppressed and as a result abnormal grain growth of a large number of Goss oriented grains is promoted.

Such a rapid temperature rise can be obtained by, for example, using the ohmic heating method or the induction heating method.

Here, the temperature raising process may be performed by several apparatuses. For example, recovery of the steel sheet, that is, holding at a temperature lower than the 550° C. at which a decrease of dislocation density in the steel occurs or gradual cooling, also can improve the temperature evenness of the steel sheet before the temperature rise, so this may be performed. Furthermore, the temperature raising process raising the temperature from 550° C. to 700° C. may also be performed by one or more apparatuses.

The point at which the temperature rise is started is the point of transition at the low temperature side of 550° C. or less from the state where the temperature of the steel sheet falls to the state where the temperature of the steel sheet rises (that is, the point where the change in temperature becomes the local minimum value). Further, the point at which the temperature rise is ended is the point of transition at the high temperature side of 700° C. or more from the state where the temperature of the steel sheet rises to the state where the temperature of the steel sheet falls (that is, the point where the change in temperature becomes the local maximum value).

However, due to the provision of a plurality of temperature raising apparatuses, at the high temperature side from the temperature raising process including 700° C., there is a possibility that the temperature of the steel sheet will continue rising. In such a case, for example, the end point of the rapid temperature rise may be made 700° C. or more or the point where the rate of change of the rate of temperature rise becomes the local minimum value at a negative value.

Here, the method of judging the start point of temperature rise and the end point of rapid temperature rise is not particularly prescribed, but, for example, it is possible to use a radiant thermometer etc. to measure the steel sheet temperature. Note that, the method of measurement of the steel sheet temperature is not particularly limited. Further, whether the end temperature of the temperature rise of the primary recrystallization continues to be lower than the decarburization annealing temperature or to be higher, the effect of the present invention remains intact. If the end temperature of the temperature rise of the primary recrystallization becomes lower than the decarburization annealing temperature, the sheet may also be heated in the decarburization annealing process. If the end temperature of the temperature rise of the primary recrystallization becomes higher than the decarburization annealing temperature, the sheet may also be treated to dissipate the heat or treated by gas cooling etc. so as to cool the steel sheet temperature. Furthermore, it is possible cool down to a temperature lower than the decarburization annealing temperature, then reheat in the decarburization annealing process.

However, if measurement of the steel sheet temperature is difficult and estimation of the accurate locations of the start point of temperature rise and the end point of rapid temperature rise is difficult, it is also possible to estimate these locations by estimating the heat patterns of the temperature raising process and cooling process. Further, the entry side temperature and exit side temperature of the steel sheet at the temperature raising apparatus in the temperature raising process may also be deemed the start point of temperature rise and the end point of rapid temperature rise.

Intermediate Treatment

Further, in another aspect of the present invention, an intermediate treatment process may be provided between the temperature raising process and decarburization annealing process in the primary recrystallization annealing, the dew point temperature of the atmosphere in the intermediate treatment process may be −40° C. or more and 0° C. or less, and the dwell time at the steel sheet temperature of 700° C. or more and 950° C. or less may be 1 second or more and 20 seconds or less.

As explained in detail later, by modifying the conditions of the solution contact treatment, it is possible to control the inhibitors in the thickness direction of the steel sheet to improve the magnetic characteristics. On the other hand, by modifying the solution contact treatment, the demerit of uneven color of the appearance of the steel sheet sometimes newly arises. Uneven color of the appearance of the steel sheet is due to the state of formation of the oxide film after decarburization annealing. More specifically, uneven color is caused in the appearance of steel sheet if the internal oxidation becomes uneven. The inventors discovered that it is possible to suppress the occurrence of uneven color by controlling the atmospheric and temperature conditions before the decarburization annealing, that is, the intermediate treatment.

If the dew point temperature of the atmosphere in the intermediate treatment process is less than −40° C., in the following decarburization annealing, the oxide film is unevenly formed and uneven color occurs in the appearance of the grain-oriented electrical steel sheet obtained as a final product, so this is not preferable. Even if the dew point temperature of the atmosphere in the intermediate treatment process is more than 0° C., in the following decarburization annealing, the oxide film is unevenly formed and uneven color occurs in the appearance of the grain-oriented electrical steel sheet obtained as a final product, so this is not preferable.

If the dwell time at the temperature of the steel sheet of 700° C. or more and 950° C. or less in the intermediate treatment is less than 1 second, the oxide film is unevenly formed in the following decarburization annealing and uneven color occurs in the appearance of the grain-oriented electrical steel sheet obtained as a final product, so this is not preferable. The upper limit of the dwell time at the temperature of the steel sheet of 700° C. or more and 950° C. or less in the intermediate treatment is not particularly prescribed, but if more than 20 seconds, the facility becomes long and large, so this is not preferable.

The mechanism by which the intermediate treatment affects the formation of an oxide film in the following decarburization annealing is not necessarily clear, but is guessed to be as follows. If performing the treatment for bringing a solution containing one or more elements from among Cu, Hg, Ag, Pb, Cd, Co, Zn, and Ni (Cu etc.) into contact with a steel sheet (solution contact treatment), the Mn of part of the MnS, MnSe, or MnTe at the surface side of the steel sheet is substituted by these elements. Cu, Hg, Ag, Pb, Cd, Co, Zn, and Ni are not uniformly distributed at the surface of the steel sheet, but become locally present at locations of presence of MnS etc., so at the locations where these elements are locally present, the internal oxidation at the following decarburization annealing is obstructed and a difference ends up arising in the amount of internal oxidation from locations where Cu, Hg, Ag, Pb, Cd, Co, Zn, and Ni are not present. Here, if a predetermined set amount of an oxide film is formed before the decarburization annealing due to the intermediate treatment, sites for internal oxidation in the following decarburization annealing are formed over the entire surface of the steel sheet, so it is believed that the internal oxidation proceeds relatively uniformly.

If the dew point temperature in the intermediate treatment is less than −40° C., in particular, at locations where Cu, Hg, Ag, Pb, Cd, Co, Zn, or Ni is locally present, the amount of formation of an oxide film in the intermediate treatment becomes insufficient, so this is not preferable. On the other hand, if the dew point temperature in the intermediate treatment is more than 0° C., in the intermediate treatment, an external oxidation type of silica film ends up being formed and after that in the decarburization annealing, progression of internal oxidation is suppressed and the oxide film ends up becoming thinner, so it is guessed that a shortage will arise in the amount of oxidation at the locations where Cu, Hg, Ag, Pb, Cd, Co, Zn, or Ni is locally present and uneven color will end up remaining in the final product.

Even if the dwell time at the steel sheet temperature of 700° C. or more and 950° C. or less in the intermediate treatment is less than 1 second, the amount of formation of the oxide film in the intermediate treatment becomes insufficient, so this is not preferable. If the dwell time is more than 20 seconds, the facility becomes long and large, so this not preferable.

Decarburization Annealing

Next, the cold rolled steel sheet is annealed for decarburization. From the viewpoint of decarburization ability, the decarburization annealing may be performed in a wet atmosphere containing hydrogen and nitrogen at a temperature of 900° C. or less. Here, to keep the decarburization from being obstructed, the oxygen partial pressure ratio of the decarburization annealing, that is, the ratio $P_{H_2O}/P_{H_2}$ of the water vapor partial pressure $P_{H_2O}$ and the hydrogen partial pressure $P_{H_2}$ in the atmosphere, may be made 0.35 or more.

Further, from the viewpoint of suppressing the occurrence of uneven color, the ratio $P_{H_2O}/PH_2$ of the water vapor partial pressure $P_{H_2O}$ and the hydrogen partial pressure $P_{H_2}$ in the atmosphere may be made 0.35 or more and 0.60 or less. If the oxygen partial pressure ratio of the atmosphere of the decarburization annealing is less than 0.35, the oxide film becomes thinner and a shortage arises in the amount of oxygen at the locations where Cu, Hg, Ag, Pb, Cd, Co, Zn, or Ni is present and uneven color ends up remaining in the final product, so this is not preferable. If the oxygen partial pressure ratio of the atmosphere of the decarburization annealing is more than 0.60, the magnetic characteristics deteriorate, so this is not preferable. Therefore, the oxygen partial pressure ratio of the atmosphere of the decarburization annealing is 0.35 or more and 0.60 or less.

Note that, in the process of primary recrystallization annealing, reduction annealing may be performed after decarburization annealing for the purpose of improving the magnetic characteristics and coating characteristics of the cold rolled steel sheet.

Process of Finish Annealing

After that, the cold rolled steel sheet after the primary recrystallization annealing is treated by finish annealing. At this time, an annealing separator containing MgO as its main constituent may be coated before the finish annealing for the purpose of preventing the steel sheets from sticking to each other, forming a primary coating, controlling the behavior of the secondary recrystallization, etc. The annealing separator is generally coated on the surface of the steel sheet in the state of an aqueous slurry and dried, but the electrostatic coating method etc. may also be used.

Next, finish annealing is performed for the purpose of forming the primary coating and secondary recrystallization. The finish annealing may, for example, be performed by heat treating the steel sheet in the coil state using a batch type heating furnace etc. Furthermore, to better reduce the core loss value of the final grain-oriented electrical steel sheet, purification treatment may be performed raising the temperature of the steel sheet in the coil state up to 1200° C. or so in temperature, then holding it there.

In finish annealing, the temperature is generally raised from room temperature or so. Further, there are various rates of temperature rise in finish annealing, but the rate is not particularly limited in the present invention. The conditions of general finish annealing can be used. For example, from the viewpoint of the productivity and general restriction on facilities, 5° C./h to 100° C./h is also possible. Further, this may be performed by other known heat patterns. In the cooling process as well, the heat pattern is not particularly limited.

The composition of the atmospheric gas in the finish annealing is not particularly limited. In the process of progression of secondary recrystallization, the gas may also be a mixed gas of nitrogen and hydrogen. The atmosphere may be a dry atmosphere or may be a wet atmosphere. The purification annealing may be performed in dry hydrogen gas.

Process of Flattening Annealing

Next, for the purpose of imparting insulation ability and tension to the steel sheet after the finish annealing, for example, an insulation coating having aluminum phosphate or colloidal silica etc. as its main constituent is coated on the surface of the steel sheet. After that, flattening annealing is performed for the purpose of baking on the insulation coating and flattening the shape of the steel sheet resulting from the finish annealing. Note that, the constituents of the insulation coating are not particularly limited so long as an insulation ability and tension are imparted to the steel sheet. Note that, in the present embodiment, needless to say, depending on the purpose of the user, the grain-oriented electrical steel sheet may also be treated to control the magnetic domains.

Process of Treating Steel Sheet by Shot Blasting and/or Leveling and Making it Contact Solution In the present process, at least one steel sheet of hot rolled steel sheet, hot rolled annealed sheet, cold rolled steel sheet, and primary recrystallized annealed sheet is treated by shot blasting and/or leveling, then dipped in a solution. The treatment for contact with a solution (below, sometimes called "solution contact treatment") is performed at least once after the hot rolling and before the finish annealing for the later explained control of inhibitors in the thickness direction. Note that, the process of treatment by shot blasting and/or leveling and contact with a solution may be performed by separate processes.

Solution Contact Treatment

The order of the procedure may change, but first the solution contact treatment will be explained. The solution contains one or more elements from among Cu, Hg, Ag, Pb, Cd, Co, Zn, and Ni (in this Description, these will sometimes be called "Cu etc."). The total of the concentrations of these elements is, by mass %, 0.00001% or more and 1.0000% or less, the pH is −1.5 or more and less than 7, the solution temperature is 15° C. or more and 100° C. or less, and the time during which the steel sheet is dipped in the solution is 5 seconds or more and 200 seconds or less.

If the total of the concentrations of the one or more elements from among Cu, Hg, Ag, Pb, Cd, Co, Zn, and Ni of the solution is less than 0.00001%, the effect of the control of inhibitors in the thickness direction becomes insufficient, so this is not preferable. If the total of the concentrations of the one or more elements from among Cu, Hg, Ag, Pb, Cd, Co, Zn, and Ni of the solution is more than 1.0000%, the effect of improvement of the magnetism is saturated and also the cost of the solution increases, so this is not preferable. Therefore, the total of the concentrations of the one or more elements from among Cu, Hg, Ag, Pb, Cd, Co, Zn, and Ni of the solution is 0.00001% or more and 1.0000% or less.

Further, if the pH of the solution is less than −1.5, the acidity becomes too strong and handling of the solution becomes difficult, so this is not preferable. If the pH of the solution is 7 or more, the effect of control of the inhibitors in the thickness direction due to the solution contact treatment becomes insufficient, so this is not preferable. Therefore, the pH of the solution is less than −1.5 or more and less than 7.

Further, if the temperature of the solution is less than 15° C., the effect of control of the inhibitors in the thickness direction due to the solution contact treatment becomes insufficient, so this is not preferable. If the temperature of the solution is more than 100° C., handling of the solution becomes difficult, so this is not preferable. Therefore, the temperature of the solution is 15° C. or more and 100° C. or less.

Further, in solution contact treatment, if the time during which the steel sheet is dipped in the solution is less than 5 seconds, the effect of the control of inhibitors in the thickness direction by solution contact treatment becomes insufficient, so this is not preferable. If the time during which the steel sheet is dipped in the solution is more than 200 seconds, the facilities become long and large, so this is not preferable. Therefore, the time during which the steel sheet is dipped in the solution is 5 seconds or more and 200 seconds or less.

The mechanism by which control of inhibitors in the thickness direction becomes possible by solution contact treatment is guessed to be as follows: If the solution contains one or more elements from among Cu, Hg, Ag, Pb, Cd, Co, Zn, and Ni (in this Description, these sometimes being referred to as "Cu etc."), since the affinity of these elements with S, Se, and Te in the solution is extremely high, these are substituted for the Mn in the MnS, MnSe, and MnTe (in this Description, these sometimes being referred to as "MnS etc.") precipitates exposed at the surface of the steel sheet to form compounds. This reaction easily occurs at the surface sides contacting the solution in particular in the MnS and other precipitates. If Mn is substituted by other metal elements (Cu etc.) at the surface sides of the MnS and other precipitates, these surface side compounds become barriers suppressing dissolution of the Mn and S, Se, and Te at the center sides of the MnS and other precipitates in the steel, so it is believed that the Ostwald ripening of MnS etc. in the finish annealing process is suppressed and the heat resistance, that is, inhibitor strength, of the MnS and other precipitates rises. This reaction occurs when a solution containing one or more elements from among Cu, Hg, Ag, Pb, Cd, Co, Zn, and Ni (Cu etc.) contacts the MnS, MnSe, or MnTe (MnS etc.) Therefore, if cracks, voids, and other defects are present at the surface of the steel sheet due to the shot blasting treatment and leveling treatment, the solution passes through these spaces to infiltrate the steel sheet whereby the solution reacts with not only the MnS etc. exposed at surface-most part of the steel sheet, but also the MnS etc. in the range down over a range of a certain depth of the surface layer of the steel sheet and causes the inhibitor strength to rise.

Shot Blasting Treatment

Due to the shot blasting treatment and other treatment, cracks, voids, and other defects are introduced into the surface of the steel sheet. In the solution contact treatment after that, the solution passes through these spaces to infiltrate the steel sheet whereby the solution reaches not only the surface-most part of the steel sheet, but also down over a range of a certain depth. Due to the above-mentioned solution treatment, it is possible to increase the heat resistance of the inhibitors by the Mn on the surfaces of the precipitates of MnS, MnSe, and MnTe (in this Description, these sometimes being referred to as "MnS etc.") acting as inhibitors being substituted by Cu etc. Therefore, due to the shot blasting, it is possible to make the solution penetrate not only at the surface-most layer of the steel sheet, but also down to a certain depth of the steel sheet and increase the strength of the MnS and other inhibitors present there.

The conditions of the shot blasting are an average particle size of the shot material of 0.1 mm or more and 5.0 mm or less and a shot speed of 10 m/s or more and 150 m/s or less. Due to this, microcracks allowing infiltration of the solution are introduced in the surface of steel sheet. As the blast material (shot material), a general one can be used. Steel balls of a hardness of Hv500 or so may be used. If the average particle size of the shot material is less than 0.1 mm, microcracks cannot be sufficiently obtained. If the average particle size of the shot material is more than 5.0 mm, the steel sheet deforms in shape and uniform deformation by cold rolling becomes difficult and good magnetic characteristics cannot be obtained. Further, if the shot speed is less than 10 m/s, microcracks cannot be sufficiently obtained. If the shot speed is more than 150 m/s, the steel sheet deforms in shape and uniform deformation by cold rolling becomes difficult and good magnetic characteristics cannot be obtained. The shape of the blasting material is generally roughly classified into spherical shapes and angular shapes. In general, an angular shape blast material has a high grinding ability and enables rapid introduction of cracks at the surface of the steel sheet. In the present invention, either of an angular shaped blasting material or spherical shaped blast material can be used. An angular shaped blast material and a spherical shaped blast material may also be used mixed together.

Leveling Treatment

As the method of introducing cracks, voids, or other defects in the surface of the steel sheet, aside from shot blasting, it is possible to use leveling treatment. Instead of shot blasting, leveling treatment may also be used. Further, shot blasting and leveling may also be jointly used. Leveling secures the flatness of the steel sheet by imparting tension to the steel sheet while bending and rebending it along a leveler roller. Through the bending and rebending by this leveling, it is possible to introduce cracks, voids, and other defects at the surface of the steel sheet. Therefore, due to the subsequent solution contact treatment, the solution can pass through the cracks, voids, and other spaces to infiltrate the steel sheet so that the solution reaches not only at the surface-most layer of the steel sheet, but also down to a certain depth of the steel sheet.

The leveling conditions are a number of times of bending of the steel sheet of two times or more, a bending angle of 10 degrees or more and 90 degrees or less, and a bending radius of 10 mm or more and 200 mm or less. Due to this, microcracks through which the solution can penetrate are introduced into the surface of the steel sheet. If the number of times of bending is less than two, microcracks cannot be sufficiently obtained. Further, if the bending angle is less than 10°, microcracks cannot be sufficiently obtained. If the bending angle is more than 90°, the steel sheet deforms in shape, uniform deformation by the cold rolling becomes difficult, and good magnetic characteristics cannot be obtained. Furthermore, if the bending radius is less than 10 mm, the steel sheet deforms in shape, uniform deformation by the cold rolling becomes difficult, and good magnetic characteristics cannot be obtained. If the bending radius is more than 200 mm, microcracks cannot be sufficiently obtained.

Method for Confirming Surfaces of "MnS Etc." Precipitates Substituted by "Cu Etc."

The method for confirming that the surfaces of the MnS and other precipitates are substituted by Cu etc. will be explained. First, the steel sheet sample to be confirmed is polished to a mirror finish and examined by an SEM-EDX. In the observed image obtained by the SEM, the presence of MnS and other precipitates can be confirmed. At the examined image, element mapping of EDX of the Cu etc., for example, Mn, S, and Cu, and the strength ratio are superposed. Due to this, it is possible to confirm the constituent elements of the precipitate particles. In a typical example, if examining the precipitate particles and their vicinities, the mapping strength ratio of the Mn and S rises at the parts of the precipitate particles, so it can be confirmed that the particles are MnS particles. Furthermore, if the mapping strength ratio of Cu also rises at the part near the surface of the particles, it is estimated that the surface of the precipitates is substituted by Cu.

Furthermore, the state of distribution of elements in the precipitate particles is confirmed by Auger electron spectroscopy. More specifically, by sputtering by Ar the surface layers of the MnS and other precipitates by Auger electron spectroscopy at several nm intervals (typically 1 nm intervals) while analyzing the elements, it is possible to confirm the distribution of constituent elements from the surface layer parts of the precipitated particles toward the inside. If Cu etc. is detected at a high concentration only at the surface layer parts of the MnS or other precipitates and the concentration of Cu etc. falls at the insides of the precipitates, it is possible to deem that the surfaces of the precipitates have been substituted by Cu etc.

Further, in the present embodiment, it is believed that cracks, voids, etc. are formed in the surface layer of the steel sheet by the shot blasting treatment or leveling treatment, so the solution passes through these spaces to infiltrate the steel sheet and reacts with not only the MnS etc. exposed at the surface-most layer of the steel sheet, but also the MnS etc. in a range of a certain depth of the surface layer of the steel sheet. By the above method of configuration, it is possible to confirm if to what extent of depth from the surface layer of the steel sheet the surfaces of the "MnS etc." precipitates have been substituted by "Cu etc." From the viewpoint of increasing the strength of the inhibitors, preferably the surfaces of the "MnS etc." precipitates are substituted by "Cu etc." down to a deep range. Typically, preferably it is substituted in a range of a depth of 10 to 500 μm from the surface of the steel sheet.

The apparatus and the measurement conditions used for the SEM, EDS, and Auger electron spectroscopy can be suitably selected in accordance with the measured object. In the analysis in this Description, for the SEM apparatus, an FE-SEM Model JEOL7001F made by JEOL is used by a WD of 10 mm and acceleration voltage of 15 kV. For the Auger electron spectroscopy analyzer, an FE-AES PHI-700 made by PHI is used by an electron beam: 10 kV, 10 nA, and ion beam: Ar/2 kV.

In general, in the process of production of steel sheet, pickling treatment is performed before the later processes for the purpose of removing scale, cleaning the surface of the steel sheet, etc. Typically, from the viewpoint of decreasing roll wear in cold rolling, the pickling treatment may also be performed before the individual cold rolling processes. Further, from the viewpoint of controlling the oxidation of the surface of the steel sheet in the primary recrystallization annealing, the pickling treatment may also be applied before the primary recrystallization annealing. Furthermore, from the viewpoint of improvement of the coatability of the annealing separator, pickling treatment may also be applied before the finish annealing. These pickling treatments may also be applied combined.

Along with this, the solution contact treatment may be included in the pickling process of the steel sheet. As pickling conditions, the above pH value, solution temperature, and contact time (pickling time) may be employed. Note that, the effect of improvement of the heat resistance of the inhibitors (precipitates) due to the present art etc. can also be obtained in application to other types of steel. For example, they may also be applied to non-oriented electrical steel sheet. In the case of application to other types of steel, the slab constituents and process conditions are not limited to the above.

It is possible to produce the final grain-oriented electrical steel sheet by the above processes. According to the method of production according to the present embodiment, it is possible to produce grain-oriented electrical steel sheet excellent in magnetic characteristics.

In the grain-oriented electrical steel sheet according to the present embodiment, further, the magnetic flux density B8 value may also be controlled. Specifically, in the grain-oriented electrical steel sheet according to the present embodiment, the magnetic flux density B8 value may be made 1.91 T or more, preferably 1.92 T or more, more preferably 1.93 T or more, still more preferably 1.94 T or more, and even more preferably 1.95 T or more. Here, the magnetic flux density B8 value is the magnetic flux density when applying a magnetic field of 800 A/m by 50 Hz to the grain-oriented electrical steel sheet. If the magnetic flux density B8 value is low, the core loss value of the grain-oriented electrical steel sheet (in particular, the hysteresis loss) ends up becoming larger, so this is not preferable. The upper limit value of the magnetic flux density B8 value is not particularly limited, but practically it may be, for example, 2.0 T. Note that, the magnetic flux density and other magnetic characteristics of grain-oriented electrical steel sheet can be measured by known methods. For example, the magnetic characteristics of grain-oriented electrical steel sheet can be measured by using the method based on the Epstein test prescribed in JIS C2550 or the single sheet magnetic characteristic test method prescribed in JIS C2556 (Single Sheet Tester: SST) etc. Note that, in R&D, if a steel ingot is formed in a vacuum melting furnace etc., it becomes difficult to obtain a test piece of an equivalent size as actual production. In this case, for example, it is also possible to obtain a test piece of a width 60 mm×length 300 mm and measure the characteristics based on the single sheet magnetic characteristic test method. Furthermore, it is also possible to multiply the obtained results by a correction coefficient so that measurement values equal to the method based on the Epstein test are obtained. In the present embodiment, measurement is performed by a measurement method by the single sheet magnetic characteristic test method.

The thus obtained grain-oriented electrical steel sheet is worked into a wound core or stacked core when producing a transformer. Here, a uniform appearance of the grain-oriented electrical steel sheet free from uneven color etc. has become an important factor in obtaining trust from users. In an embodiment of the present invention, when preparing color samples dividing the levels of colors from white to black into eight equal parts, dividing a 50 mm×50 mm area of the steel sheet, judging the levels of the colors of the divided regions by the eight-level color samples, and two or more stages of color difference arise between these regions, it may be judged that there is uneven color. For example, it is possible to prepare color samples by simultaneously scanning steel sheet samples provided with various tones and white and black color samples and using commercially available image processing software to classify the samples equally dividing the luminances from white to black into eight equal levels. By comparing these color samples and steel sheet, it is possible to analyze if two or more stages of color difference occur in the 50 mm×50 mm area of the steel sheet.

Above, the grain-oriented electrical steel sheet according to the present embodiment was explained. The grain-oriented electrical steel sheet according to the present embodiment can be produced by the method for producing grain-oriented electrical steel sheet of the above-mentioned present embodiment. However, the invention is not limited to only this method.

EXAMPLES

Below, while showing examples, a method for producing grain-oriented electrical steel sheet and grain-oriented electrical steel sheet according to embodiments of the present invention will be explained in more detail. Note that, the examples shown below are just illustrations of the grain-oriented electrical steel sheet according to the embodiments. The grain-oriented electrical steel sheet according to the present embodiment is not limited to the examples shown below.

Example 1

Production of Grain-Oriented Electrical Steel Sheets

First, a steel ingot containing C: 0.04%, Si: 3.3%, Mn: 0.09%, S: 0.002%, Se: 0.001%, Te: 0.001%, acid soluble Al: 0.005%, and N: 0.003% and having a balance of Fe and impurities was prepared. The steel ingot was annealed at 1200° C. for 1 hour, then was hot rolled to thereby obtain thickness 2.3 mm hot rolled steel sheets. The obtained hot rolled sheet sheets were annealed at a peak temperature of 1000° C. for 140 seconds, pickled, then process annealed and treated by shot blasting and treated by solution contact between two cold rolling processes to thereby obtain thickness 0.23 mm cold rolled steel sheets. Here, the conditions of the shot blasting treatment and conditions of the solution contact treatment after process annealing are the conditions shown in Table 1.

Next, the obtained cold rolled steel sheets were annealed for primary recrystallization in a wet hydrogen atmosphere and 850° C. for 180 seconds. Here, the rates of temperature rise were made the conditions shown in Table 1. Next, the surfaces of the steel sheets after the primary recrystallization annealing were coated with an annealing separator containing MgO in the state of an aqueous slurry and then dried. After that, these were finish annealed and the finish annealed steel sheets were rinsed. After that, the surfaces of the steel sheets were coated with an insulation coating having aluminum phosphate and colloidal silica as its main constituents, then was annealed for flattening for the purpose of baking on the insulation coating and flattening the steel sheets.

Samples of the grain-oriented electrical steel sheets after flattening annealing obtained by the above were cut and annealed to relieve stress, then the single sheet magnetic characteristic measurement method for a sample size of 60 mm×300 mm (based on the method described in JIS C2556) was used to measure the magnetic flux density B8 values of the grain-oriented electrical steel sheets according to the invention examples and comparative examples. Here, the B8 value is the magnetic flux density of a steel sheet when exciting a grain-oriented electrical steel sheet by 50 Hz at 800 A/m. In the present invention, the average value of five samples was used.

Here, a condition where the magnetic flux density B8 value of the grain-oriented electrical steel sheet became 1.91 T or more was judged as good (B), a condition where it became 1.92 T or more was judged as further good (A), and a condition where it became 1.93 T or more was judged as very good (S). Further, conditions other than the above were judged as poor (C).

The production conditions, measurement results, and evaluations of the above present examples and comparative examples are shown in Table 1.

TABLE 1

| Condition | Shot blast conditions: Average particle size | Shot blast conditions: Shot speed | Shot blast conditions: Shape | Solution contact conditions: Metal type | Solution contact conditions: Metal type concentration (%) | Solution contact conditions: Solution (base) | Solution contact conditions: pH | Solution contact conditions: Solution temp. (° C.) | Solution contact conditions: Contact time of solution steel and sheet (s) | Rate of rapid temperature rise (° C./s) | Magnetic flux density B8 value (T) | Evaluation | Remarks |
|---|---|---|---|---|---|---|---|---|---|---|---|---|---|
| A1 | 2 | 50 | Angular | Cu | 0.000005 | Hydrochloric acid | 3 | 70 | 30 | 20 | 1.895 | C | Comp. ex. |
| A2 | 2 | 50 | Angular | Cu | 0.000010 | Hydrochloric acid | 3 | 70 | 30 | 20 | 1.910 | B | Present ex. |
| A3 | 2 | 50 | Angular | Cu | 0.00010 | Hydrochloric acid | 3 | 70 | 30 | 20 | 1.916 | B | Present ex. |
| A4 | 2 | 50 | Angular | Cu | 0.01000 | Hydrochloric acid | 3 | 70 | 30 | 20 | 1.918 | B | Present ex. |
| A5 | 2 | 50 | Angular | Cu | 0.10000 | Hydrochloric acid | 3 | 70 | 30 | 20 | 1.919 | B | Present ex. |
| A6 | 2 | 50 | Angular | Cu | 0.00100 | Hydrochloric acid | 0 | 70 | 30 | 20 | 1.919 | B | Present ex. |
| A7 | 2 | 50 | Angular | Cu | 0.00100 | Hydrochloric acid | 3 | 70 | 30 | 20 | 1.919 | B | Present ex. |
| A8 | 2 | 50 | Angular | Cu | 0.00100 | Hydrochloric acid | 5 | 70 | 30 | 20 | 1.917 | B | Present ex. |
| A9 | 2 | 50 | Angular | Cu | 0.00100 | Hydrochloric acid | 6 | 70 | 30 | 20 | 1.916 | B | Present ex. |
| A10 | 2 | 50 | Angular | Cu | 0.00100 | Hydrochloric acid | 7 | 70 | 30 | 20 | 1.902 | C | Comp. ex. |
| A11 | 2 | 50 | Angular | Cu | 0.00100 | Hydrochloric acid | 3 | 10 | 30 | 20 | 1.903 | C | Comp. ex. |
| A12 | 2 | 50 | Angular | Cu | 0.00100 | Hydrochloric acid | 3 | 15 | 30 | 20 | 1.915 | B | Present ex. |
| A13 | 2 | 50 | Angular | Cu | 0.00100 | Hydrochloric acid | 3 | 50 | 30 | 20 | 1.917 | B | Present ex. |

TABLE 1-continued

| | Shot blast conditions | | | Solution contact conditions | | | | | | Rate | Magnetic | | |
|---|---|---|---|---|---|---|---|---|---|---|---|---|---|
| Condition | Average particle size | Shot speed | Shape | Metal type | Metal type concen-tration (%) | Solution (base) | pH | Solution temp. (° C.) | Contact time of solution steel and sheet (s) | of rapid temper-ature rise (° C./s) | flux density B8 value (T) | Eval-uation | Remarks |
| A14 | 2 | 50 | Angular | Cu | 0.00100 | Hydrochloric acid | 3 | 100 | 30 | 20 | 1.919 | B | Present ex. |
| A15 | 2 | 50 | Angular | Cu | 0.00100 | Hydrochloric acid | 3 | 70 | 3 | 20 | 1.903 | C | Comp. ex. |
| A16 | 2 | 50 | Angular | Cu | 0.00100 | Hydrochloric acid | 3 | 70 | 5 | 20 | 1.915 | B | Present ex. |
| A17 | 2 | 50 | Angular | Cu | 0.00100 | Hydrochloric acid | 3 | 70 | 10 | 20 | 1.917 | B | Present ex. |
| A18 | 2 | 50 | Angular | Cu | 0.00100 | Hydrochloric acid | 3 | 70 | 100 | 20 | 1.919 | B | Present ex. |
| A19 | 2 | 50 | Angular | Cu | 0.00100 | Hydrochloric acid | 3 | 70 | 200 | 20 | 1.919 | B | Present ex. |
| A20 | 2 | 50 | Angular | Hg | 0.00100 | Hydrochloric acid | 3 | 70 | 30 | 20 | 1.919 | B | Present ex. |
| A21 | 2 | 50 | Angular | Ag | 0.00100 | Hydrochloric acid | 3 | 70 | 30 | 20 | 1.919 | B | Present ex. |
| A22 | 2 | 50 | Angular | Pb | 0.00100 | Hydrochloric acid | 3 | 70 | 30 | 20 | 1.919 | B | Present ex. |
| A23 | 2 | 50 | Angular | Cd | 0.00100 | Hydrochloric acid | 3 | 70 | 30 | 20 | 1.918 | B | Present ex. |
| A24 | 2 | 50 | Angular | Co | 0.00100 | Hydrochloric acid | 3 | 70 | 30 | 20 | 1.919 | B | Present ex. |
| A25 | 2 | 50 | Angular | Zn | 0.00100 | Hydrochloric acid | 3 | 70 | 30 | 20 | 1.918 | B | Present ex. |
| A26 | 2 | 50 | Angular | Ni | 0.00100 | Hydrochloric acid | 3 | 70 | 30 | 20 | 1.918 | B | Present ex. |
| A27 | 2 | 50 | Angular | Cu + Ni | 0.00100 | Hydrochloric acid | 3 | 70 | 30 | 20 | 1.918 | B | Present ex. |
| A28 | 2 | 50 | Angular | Ag + Co + Zn | 0.00100 | Hydrochloric acid | 3 | 70 | 30 | 20 | 1.919 | B | Present ex. |
| A29 | 2 | 50 | Angular | Cu | 1.00000 | Sulfuric acid | 2.5 | 70 | 30 | 20 | 1.919 | B | Present ex. |
| A30 | 2 | 50 | Angular | Cu | 1.00000 | Nitric acid | 2.5 | 70 | 30 | 20 | 1.918 | B | Present ex. |
| A31 | 2 | 50 | Angular | Cu | 1.00000 | Phosphoric acid | 2.5 | 70 | 30 | 20 | 1.918 | B | Present ex. |
| A32 | 0.05 | 50 | Angular | Cu | 0.00100 | Hydrochloric acid | 3 | 70 | 30 | 20 | 1.902 | C | Comp. ex. |
| A33 | 0.1 | 50 | Angular | Cu | 0.00100 | Hydrochloric acid | 3 | 70 | 30 | 20 | 1.919 | B | Present ex. |
| A34 | 5 | 50 | Angular | Cu | 0.00100 | Hydrochloric acid | 3 | 70 | 30 | 20 | 1.919 | B | Present ex. |
| A35 | 10 | 50 | Angular | Cu | 0.00100 | Hydrochloric acid | 3 | 70 | 30 | 20 | 1.904 | C | Comp. ex. |
| A36 | 2 | 5 | Angular | Cu | 0.00100 | Hydrochloric acid | 3 | 70 | 30 | 20 | 1.903 | C | Comp. ex. |
| A37 | 2 | 10 | Angular | Cu | 0.00100 | Hydrochloric acid | 3 | 70 | 30 | 20 | 1.919 | B | Present ex. |
| A38 | 2 | 150 | Angular | Cu | 0.00100 | Hydrochloric acid | 3 | 70 | 30 | 20 | 1.919 | B | Present ex. |
| A39 | 2 | 200 | Angular | Cu | 0.00100 | Hydrochloric acid | 3 | 70 | 30 | 20 | 1.904 | C | Comp. ex. |
| A40 | 2 | 50 | Round | Cu | 0.00100 | Hydrochloric acid | 3 | 70 | 30 | 20 | 1.919 | B | Present ex. |
| A41 | 2 | 50 | Angular | Cu | 0.00100 | Hydrochloric acid | 3 | 70 | 30 | 100 | 1.926 | A | Present ex. |
| A42 | 2 | 50 | Angular | Cu | 0.00100 | Hydrochloric acid | 3 | 70 | 30 | 400 | 1.929 | A | Present ex. |
| A43 | 2 | 50 | Angular | Cu | 0.00100 | Hydrochloric acid | 3 | 70 | 30 | 700 | 1.936 | S | Present ex. |
| A44 | 2 | 50 | Angular | Cu | 0.00100 | Hydrochloric acid | 3 | 70 | 30 | 1500 | 1.938 | S | Present ex. |

Referring to the results of Table 1, it was learned that the grain-oriented electrical steel sheets satisfying the conditions of the present embodiment were judged to be good.

Example 2

First, a steel ingot containing C: 0.08%, Si: 3.2%, Mn: 0.08%, S: 0.024%, acid soluble Al: 0.03%, and N: 0.008% and having a balance of Fe and impurities was prepared. The steel ingot was annealed at 1350° C. for 1 hour, then was hot rolled to thereby obtain thickness 2.3 mm hot rolled steel sheets. The obtained hot rolled sheet sheets were annealed at a peak temperature of 1100° C. for 140 seconds, treated to level them and treated by solution contact, then cold rolled to thereby obtain thickness 0.23 mm cold rolled steel sheets. Here, the conditions of the leveling treatment and conditions of the solution contact treatment after the hot rolled annealing are the conditions shown in Table 2.

Next, the obtained cold rolled steel sheets were annealed for primary recrystallization in a wet hydrogen atmosphere and 850° C. for 180 seconds. Here, the rates of temperature rise were made the conditions shown in Table 2. Next, the surfaces of the steel sheets after primary recrystallization annealing were coated with an annealing separator containing MgO in the state of an aqueous slurry and dried. After that, these were finish annealed and the finish annealed steel sheets were rinsed. After that, these were finish annealed and the finish annealed steel sheets were rinsed. After that, the surfaces of the steel sheets were coated with an insulation coating having aluminum phosphate and colloidal silica as its main constituent, then were annealed for flattening for the purpose of baking on the insulation coating and flattening the steel sheets.

Samples of the grain-oriented electrical steel sheets after flattening annealing obtained by the above were cut and annealed to relieve stress, then the single sheet magnetic characteristic measurement method for a sample size of 60 mm×300 mm (based on the method described in JIS C2556) was used to measure the magnetic flux density B8 values of the grain-oriented electrical steel sheets according to the invention examples and comparative examples. Here, the B8 value is the magnetic flux density of a steel sheet when exciting a grain-oriented electrical steel sheet by 50 Hz at 800 A/m. In the present invention, the average value of five samples was used.

Here, a condition where the magnetic flux density B8 value of the grain-oriented electrical steel sheet became 1.92 T or more was judged as good (B), a condition where it became 1.93 T or more was judged as further good (A), and a condition where it became 1.94 T or more was judged as very good (S).

The production conditions, measurement results, and evaluations of the above present examples and comparative examples are shown in Table 2.

TABLE 2

| | Leveling | | | Solution contact conditions | | | | | | Rate | Magnetic | | |
|---|---|---|---|---|---|---|---|---|---|---|---|---|---|
| Condition | No. of times | Bending angle | Bending radius | Metal type | Metal type concentration (%) | Solution (base) | pH | Solution temp. (° C.) | Contact time of solution steel and sheet (s) | of rapid temperature rise (° C./s) | flux density B8 value (T) | Evaluation | Remarks |
| B1 | 2 | 60 | 100 | Cu | 0.000005 | Hydrochloric acid | 3 | 70 | 30 | 20 | 1.905 | C | Comp. ex. |
| B2 | 2 | 60 | 100 | Cu | 0.000010 | Hydrochloric acid | 3 | 70 | 30 | 20 | 1.920 | B | Present ex. |
| B3 | 2 | 60 | 100 | Cu | 0.00010 | Hydrochloric acid | 3 | 70 | 30 | 20 | 1.924 | B | Present ex. |
| B4 | 2 | 60 | 100 | Cu | 0.01000 | Hydrochloric acid | 3 | 70 | 30 | 20 | 1.928 | B | Present ex. |
| B5 | 2 | 60 | 100 | Cu | 0.10000 | Hydrochloric acid | 3 | 70 | 30 | 20 | 1.928 | B | Present ex. |
| B6 | 2 | 60 | 100 | Cu | 0.00100 | Hydrochloric acid | 0 | 70 | 30 | 20 | 1.929 | B | Present ex. |
| B7 | 2 | 60 | 100 | Cu | 0.00100 | Hydrochloric acid | 3 | 70 | 30 | 20 | 1.928 | B | Present ex. |
| B8 | 2 | 60 | 100 | Cu | 0.00100 | Hydrochloric acid | 5 | 70 | 30 | 20 | 1.925 | B | Present ex. |
| B9 | 2 | 60 | 100 | Cu | 0.00100 | Hydrochloric acid | 6 | 70 | 30 | 20 | 1.925 | B | Present ex. |
| B10 | 2 | 60 | 100 | Cu | 0.00100 | Hydrochloric acid | 7 | 70 | 30 | 20 | 1.912 | C | Comp. ex. |
| B11 | 2 | 60 | 100 | Cu | 0.00100 | Hydrochloric acid | 3 | 10 | 30 | 20 | 1.912 | C | Comp. ex. |
| B12 | 2 | 60 | 100 | Cu | 0.00100 | Hydrochloric acid | 3 | 15 | 30 | 20 | 1.924 | B | Present ex. |
| B13 | 2 | 60 | 100 | Cu | 0.00100 | Hydrochloric acid | 3 | 50 | 30 | 20 | 1.927 | B | Present ex. |
| B14 | 2 | 60 | 100 | Cu | 0.00100 | Hydrochloric acid | 3 | 100 | 30 | 20 | 1.928 | B | Present ex. |
| B15 | 2 | 60 | 100 | Cu | 0.00100 | Hydrochloric acid | 3 | 70 | 3 | 20 | 1.913 | C | Comp. ex. |
| B16 | 2 | 60 | 100 | Cu | 0.00100 | Hydrochloric acid | 3 | 70 | 5 | 20 | 1.924 | B | Present ex. |
| B17 | 2 | 60 | 100 | Cu | 0.00100 | Hydrochloric acid | 3 | 70 | 10 | 20 | 1.926 | B | Present ex. |
| B18 | 2 | 60 | 100 | Cu | 0.00100 | Hydrochloric acid | 3 | 70 | 100 | 20 | 1.928 | B | Present ex. |

TABLE 2-continued

| | Leveling | | | Solution contact conditions | | | | | | Rate of rapid temperature rise | Magnetic flux density B8 value | | |
|---|---|---|---|---|---|---|---|---|---|---|---|---|---|
| Condition | No. of times | Bending angle | Bending radius | Metal type | Metal type concentration (%) | Solution (base) | pH | Solution temp. (° C.) | Contact time of solution steel and sheet (s) | (° C./s) | (T) | Evaluation | Remarks |
| B19 | 2 | 60 | 100 | Cu | 0.00100 | Hydrochloric acid | 3 | 70 | 200 | 20 | 1.929 | B | Present ex. |
| B20 | 2 | 60 | 100 | Hg | 0.00100 | Hydrochloric acid | 3 | 70 | 30 | 20 | 1.928 | B | Present ex. |
| B21 | 2 | 60 | 100 | Ag | 0.00100 | Hydrochloric acid | 3 | 70 | 30 | 20 | 1.929 | B | Present ex. |
| B22 | 2 | 60 | 100 | Pb | 0.00100 | Hydrochloric acid | 3 | 70 | 30 | 20 | 1.929 | B | Present ex. |
| B23 | 2 | 60 | 100 | Cd | 0.00100 | Hydrochloric acid | 3 | 70 | 30 | 20 | 1.928 | B | Present ex. |
| B24 | 2 | 60 | 100 | Co | 0.00100 | Hydrochloric acid | 3 | 70 | 30 | 20 | 1.928 | B | Present ex. |
| B25 | 2 | 60 | 100 | Zn | 0.00100 | Hydrochloric acid | 3 | 70 | 30 | 20 | 1.928 | B | Present ex. |
| B26 | 2 | 60 | 100 | Ni | 0.00100 | Hydrochloric acid | 3 | 70 | 30 | 20 | 1.928 | B | Present ex. |
| B27 | 2 | 60 | 100 | Cu + Ni | 0.00100 | Hydrochloric acid | 3 | 70 | 30 | 20 | 1.928 | B | Present ex. |
| B28 | 2 | 60 | 100 | Ag + Co + Zn | 0.00100 | Hydrochloric acid | 3 | 70 | 30 | 20 | 1.929 | B | Present ex. |
| B29 | 2 | 60 | 100 | Cu | 1.00000 | Sulfuric acid | 2.5 | 70 | 30 | 20 | 1.929 | B | Present ex. |
| B30 | 2 | 60 | 100 | Cu | 1.00000 | Nitric acid | 2.5 | 70 | 30 | 20 | 1.928 | B | Present ex. |
| B31 | 2 | 60 | 100 | Cu | 1.00000 | Phosphoric acid | 2.5 | 70 | 30 | 20 | 1.927 | B | Present ex. |
| B32 | 2 | 5 | 100 | Cu | 0.00100 | Hydrochloric acid | 3 | 70 | 30 | 20 | 1.911 | C | Comp. ex. |
| B33 | 2 | 10 | 100 | Cu | 0.00100 | Hydrochloric acid | 3 | 70 | 30 | 20 | 1.928 | B | Present ex. |
| B34 | 2 | 90 | 100 | Cu | 0.00100 | Hydrochloric acid | 3 | 70 | 30 | 20 | 1.928 | B | Present ex. |
| B35 | 2 | 120 | 100 | Cu | 0.00100 | Hydrochloric acid | 3 | 70 | 30 | 20 | 1.913 | C | Comp. ex. |
| B36 | 2 | 60 | 7 | Cu | 0.00100 | Hydrochloric acid | 3 | 70 | 30 | 20 | 1.911 | C | Comp. ex. |
| B37 | 2 | 60 | 10 | Cu | 0.00100 | Hydrochloric acid | 3 | 70 | 30 | 20 | 1.928 | B | Present ex. |
| B38 | 2 | 60 | 200 | Cu | 0.00100 | Hydrochloric acid | 3 | 70 | 30 | 20 | 1.928 | B | Present ex. |
| B39 | 2 | 60 | 250 | Cu | 0.00100 | Hydrochloric acid | 3 | 70 | 30 | 20 | 1.912 | C | Comp. ex. |
| B40 | 1 | 60 | 100 | Cu | 0.00100 | Hydrochloric acid | 3 | 70 | 30 | 20 | 1.914 | C | Comp. ex. |
| B41 | 2 | 60 | 100 | Cu | 0.00100 | Hydrochloric acid | 3 | 70 | 30 | 100 | 1.934 | A | Present ex. |
| B42 | 2 | 60 | 100 | Cu | 0.00100 | Hydrochloric acid | 3 | 70 | 30 | 400 | 1.938 | A | Present ex. |
| B43 | 2 | 60 | 100 | Cu | 0.00100 | Hydrochloric acid | 3 | 70 | 30 | 700 | 1.944 | S | Present ex. |
| B44 | 2 | 60 | 100 | Cu | 0.00100 | Hydrochloric acid | 3 | 70 | 30 | 1500 | 1.945 | S | Present ex. |

Referring to the results of Table 2, it was learned that the grain-oriented electrical steel sheets satisfying the conditions of the present embodiment were judged to be good.

Example 3

First, a steel ingot containing, by mass %, C: 0.08%, Si: 3.3%, Mn: 0.08%, S: 0.025%, acid soluble Al: 0.03%, and N: 0.008% and having a balance of the constituents shown in Table 3 and Fe and impurities was prepared. The steel ingot was annealed at 1350° C. for 1 hour, then was hot rolled to thereby obtain thickness 2.3 mm hot rolled steel sheets. The obtained hot rolled sheet sheets were annealed at a peak temperature of 1100° C. for 140 seconds, treated by shot blasting and treated by solution contact, then cold rolled to thereby obtain thickness 0.23 mm cold rolled steel sheets. Here, the conditions of the shot blasting treatment and conditions of the solution contact treatment after hot rolled annealing are an average particle size of the shot: 2 mm, shot speed: 50 m/s, shape: angular, concentration of Cu in solution: 0.001%, solution (base): hydrochloric acid, pH of solution: 3, solution temperature: 70° C., and contact time of solution and steel sheet: 30 seconds.

Next, the obtained cold rolled steel sheets were annealed for primary recrystallization in a wet hydrogen atmosphere and 850° C. for 180 seconds. Here, the rates of temperature rise were made the conditions shown in Table 3. Next, the surfaces of the steel sheets after primary recrystallization annealing were coated with an annealing separator containing MgO in the state of an aqueous slurry and dried. After that, these were finish annealed and the finish annealed steel sheets were rinsed. After that, the surfaces of the steel sheets were coated with an insulation coating having aluminum phosphate and colloidal silica as its main constituent, then were annealed for flattening for the purpose of baking on the insulation coating and flattening the steel sheets.

Samples of the grain-oriented electrical steel sheets after flattening annealing obtained by the above were cut and annealed to relieve stress, then the single sheet magnetic characteristic measurement method for a sample size of 60 mm×300 mm (based on the method described in JIS C2556) was used to measure the magnetic flux density B8 values of the grain-oriented electrical steel sheets according to the invention examples and comparative examples. Here, the B8 value is the magnetic flux density of a steel sheet when exciting a grain-oriented electrical steel sheet by 50 Hz at 800 A/m. In the present invention, the average value of five samples was used.

Here, a condition where the magnetic flux density B8 value of the grain-oriented electrical steel sheet became 1.92 T or more was judged as good (B), a condition where it became 1.93 T or more was judged as further good (A), a condition where it became 1.94 T or more was judged as very good, and a condition where it became 1.95 T or more was judged as the best (SS).

The production conditions, measurement results, and evaluations of the above present examples and comparative examples are shown in Table 3.

TABLE 3

| | Constituents in slab | | | | | | Rapid | Magnetic | | |
|---|---|---|---|---|---|---|---|---|---|---|
| Condition | Cu content (%) | Sn content (%) | Ni content (%) | Cr content (%) | Sb content (%) | Bi content (%) | heating rate (° C./s) | flux density B8 value (T) | Evaluation | Remarks |
| C1 | 0.0005 | 0 | 0 | 0 | 0 | 0 | 20 | 1.936 | A | Present ex. |
| C2 | 0.3000 | 0 | 0 | 0 | 0 | 0 | 20 | 1.937 | A | Present ex. |
| C3 | 1.0000 | 0 | 0 | 0 | 0 | 0 | 20 | 1.938 | A | Present ex. |
| C4 | 0 | 0.0005 | 0 | 0 | 0 | 0 | 20 | 1.936 | A | Present ex. |
| C5 | 0 | 0.3000 | 0 | 0 | 0 | 0 | 20 | 1.938 | A | Present ex. |
| C6 | 0 | 1.0000 | 0 | 0 | 0 | 0 | 20 | 1.939 | A | Present ex. |
| C7 | 0 | 0 | 0.0005 | 0 | 0 | 0 | 20 | 1.936 | A | Present ex. |
| C8 | 0 | 0 | 0.3000 | 0 | 0 | 0 | 20 | 1.937 | A | Present ex. |
| C9 | 0 | 0 | 1.0000 | 0 | 0 | 0 | 20 | 1.938 | A | Present ex. |
| C10 | 0 | 0 | 0 | 0.0005 | 0 | 0 | 20 | 1.936 | A | Present ex. |
| C11 | 0 | 0 | 0 | 0.3000 | 0 | 0 | 20 | 1.937 | A | Present ex. |
| C12 | 0 | 0 | 0 | 1.0000 | 0 | 0 | 20 | 1.937 | A | Present ex. |
| C13 | 0 | 0 | 0 | 0 | 0.0005 | 0 | 20 | 1.936 | A | Present ex. |
| C14 | 0 | 0 | 0 | 0 | 0.3000 | 0 | 20 | 1.938 | A | Present ex. |
| C15 | 0 | 0 | 0 | 0 | 1.0000 | 0 | 20 | 1.939 | A | Present ex. |
| C16 | 0 | 0 | 0 | 0 | 0 | 0.0005 | 20 | 1.941 | S | Present ex. |
| C17 | 0 | 0 | 0 | 0 | 0 | 0.3000 | 20 | 1.943 | S | Present ex. |
| C18 | 0 | 0 | 0 | 0 | 0 | 1.0000 | 20 | 1.943 | S | Present ex. |
| C19 | 0.1 | 0.1 | 0 | 0 | 0 | 0 | 20 | 1.937 | A | Present ex. |
| C20 | 0.1 | 0 | 0.1 | 0.1 | 0 | 0 | 20 | 1.938 | A | Present ex. |
| C21 | 0 | 0.1 | 0 | 0 | 0.1 | 0.1 | 20 | 1.943 | S | Present ex. |
| C22 | 0 | 0 | 0 | 0.1 | 0.1 | 0.1 | 20 | 1.943 | S | Present ex. |
| C23 | 0.1 | 0.1 | 0.1 | 0.1 | 0.1 | 0.1 | 20 | 1.943 | S | Present ex. |
| C24 | 0.0005 | 0 | 0 | 0 | 0 | 0 | 100 | 1.951 | SS | Present ex. |
| C25 | 0.3000 | 0 | 0 | 0 | 0 | 0 | 100 | 1.953 | SS | Present ex. |
| C26 | 1.0000 | 0 | 0 | 0 | 0 | 0 | 100 | 1.953 | SS | Present ex. |
| C27 | 0 | 0.0005 | 0 | 0 | 0 | 0 | 100 | 1.953 | SS | Present ex. |

TABLE 3-continued

| | Constituents in slab | | | | | | Rapid | Magnetic | | |
|---|---|---|---|---|---|---|---|---|---|---|
| Condition | Cu content (%) | Sn content (%) | Ni content (%) | Cr content (%) | Sb content (%) | Bi content (%) | heating rate (° C./s) | flux density B8 value (T) | Eval-uation | Remarks |
| C28 | 0 | 0.3000 | 0 | 0 | 0 | 0 | 100 | 1.952 | SS | Present ex. |
| C29 | 0 | 1.0000 | 0 | 0 | 0 | 0 | 100 | 1.953 | SS | Present ex. |
| C30 | 0 | 0 | 0.0005 | 0 | 0 | 0 | 100 | 1.951 | SS | Present ex. |
| C31 | 0 | 0 | 0.3000 | 0 | 0 | 0 | 100 | 1.953 | SS | Present ex. |
| C32 | 0 | 0 | 1.0000 | 0 | 0 | 0 | 100 | 1.954 | SS | Present ex. |
| C33 | 0 | 0 | 0 | 0.0005 | 0 | 0 | 100 | 1.951 | SS | Present ex. |
| C34 | 0 | 0 | 0 | 0.3000 | 0 | 0 | 100 | 1.952 | SS | Present ex. |
| C35 | 0 | 0 | 0 | 1.0000 | 0 | 0 | 100 | 1.952 | SS | Present ex. |
| C36 | 0 | 0 | 0 | 0 | 0.0005 | 0 | 100 | 1.951 | SS | Present ex. |
| C37 | 0 | 0 | 0 | 0 | 0.3000 | 0 | 100 | 1.953 | SS | Present ex. |
| C38 | 0 | 0 | 0 | 0 | 1.0000 | 0 | 100 | 1.954 | SS | Present ex. |
| C39 | 0 | 0 | 0 | 0 | 0 | 0.0005 | 100 | 1.956 | SS | Present ex. |
| C40 | 0 | 0 | 0 | 0 | 0 | 0.3000 | 100 | 1.957 | SS | Present ex. |
| C41 | 0 | 0 | 0 | 0 | 0 | 1.0000 | 100 | 1.958 | SS | Present ex. |
| C42 | 0.1 | 0.1 | 0 | 0 | 0 | 0 | 100 | 1.952 | SS | Present ex. |
| C43 | 0.1 | 0 | 0.1 | 0.1 | 0 | 0 | 100 | 1.952 | SS | Present ex. |
| C44 | 0 | 0.1 | 0 | 0 | 0.1 | 0.1 | 100 | 1.957 | SS | Present ex. |
| C45 | 0 | 0 | 0 | 0.1 | 0.1 | 0.1 | 100 | 1.957 | SS | Present ex. |
| C46 | 0.1 | 0.1 | 0.1 | 0.1 | 0.1 | 0.1 | 100 | 1.958 | SS | Present ex. |
| C47 | 0 | 0.3000 | 0 | 0 | 0 | 0 | 400 | 1.954 | SS | Present ex. |
| C48 | 0 | 0.3000 | 0 | 0 | 0 | 0 | 700 | 1.955 | SS | Present ex. |
| C49 | 0 | 0.3000 | 0 | 0 | 0 | 0 | 1500 | 1.957 | SS | Present ex. |
| C50 | 0 | 0 | 0 | 0 | 0 | 0.3000 | 400 | 1.959 | SS | Present ex. |
| C51 | 0 | 0 | 0 | 0 | 0 | 0.3000 | 700 | 1.961 | SS | Present ex. |
| C52 | 0 | 0 | 0 | 0 | 0 | 0.3000 | 1500 | 1.962 | SS | Present ex. |

Referring to the results of Table 3, it was learned that the grain-oriented electrical steel sheets satisfying the conditions of the present embodiment were judged to be good.

Example 4

Except for performing the intermediate treatment from the rise in temperature in the primary recrystallization annealing to the decarburization annealing (dew point temperature of atmosphere and dwell time at steel sheet temperature of 700° C. or more and 950° C. or less) and the decarburization annealing (oxygen partial pressure ratio of atmosphere) under various conditions, grain-oriented electrical steel sheets were produced under conditions similar to the present inventions of Examples 1 to 3.

Samples of the grain-oriented electrical steel sheets obtained above were cut and judged for whether two stages or more of color differences occurred in an area of 50 mm×50 mm when dividing the luminance from white to black into eight equal parts. If one stage or less of color difference, the sample was judged good in color evenness, while if two stages or more, the same was judged poor in color evenness.

Samples of the grain-oriented electrical steel sheets after flattening annealing obtained by the above were cut and annealed to relieve stress, then the single sheet magnetic characteristic measurement method for a sample size of 60 mm×300 mm (based on the method described in JIS C2556) was used to measure the magnetic flux density B8 values of the grain-oriented electrical steel sheets according to the invention examples and comparative examples. Here, the B8 value is the magnetic flux density of a steel sheet when exciting a grain-oriented electrical steel sheet by 50 Hz at 800 A/m. In the present invention, the average value of five samples was used.

Here, a condition where there were not two stages or more of color difference and the magnetic flux density B8 value of the grain-oriented electrical steel sheet became 1.91 T or more was judged as the best (B). Conditions other than the above were judged as poor (C).

If, in the intermediate treatment, the dew point temperature of the atmosphere was −40° C. or more and 0° C. or less and the dwell time at the steel sheet temperature of 700° C. or more and 950° C. or less was 1 second or more and 20 seconds or less and, in the decarburization annealing, the oxygen partial pressure ratio ($P_{H_2O}/P_{H_2}$) of the atmosphere was 0.35 or more and 0.60 or less, it was learned that there were not two stages or more of color difference and the magnetic flux density B8 value of the grain-oriented electrical steel sheet became 1.91 T or more, that is, a "good" result of judgment (B) was obtained.

The invention claimed is:

1. A method for producing grain-oriented electrical steel sheet comprising a process of heating and hot rolling a slab containing, by mass %, C: 0.01% or more and 0.10% or less, Si: 2.5% or more and 4.5% or less, Mn: 0.01% or more and 0.50% or less, a total of one or more of S, Se, and Te: 0.001% or more and 0.050% or less, acid soluble Al: more than 0% and 0.05% or less, and N: more than 0% and 0.015% or less and having a balance of Fe and impurities to obtain a hot rolled steel sheet or annealing the hot rolled steel sheet to obtain a hot rolled annealed sheet, wherein the slab optionally contains, in place of part of the Fe, one or more of Cu: 1.0% or less, Sn: 1.0% or less, Ni: 1.0% or less, Cr: 1.0% or less, Sb: 1.0% or less, and Bi: 1.0% or less, wherein the grain-oriented electrical steel sheet includes one or more of MnS, MnSe, and MnTe, a process of cold rolling the hot rolled steel sheet or the hot rolled annealed sheet to obtain a cold rolled steel sheet, a process of annealing the cold rolled steel sheet for primary recrystallization to obtain a primary recrystallized annealed sheet, a process of coating a surface of the primary recrystallized annealed sheet with an annealing separator including MgO, then finish annealing it to obtain a finish annealed sheet, a process of coating the finish annealed sheet with an insulation coating, then annealing it for flattening, at least one steel sheet among the hot rolled steel sheet, the hot rolled annealed sheet, the cold rolled steel sheet, and the primary recrystallized annealed sheet being treated by shot blasting and treated by contact with a solution, wherein the solution penetrates to a depth of 10 to 500 μm from the surface of the steel sheet, in the shot blasting treatment, an average particle size of the shot material being 0.1 mm or more and 5.0 mm or less and a shot speed being 10 m/s or more and 150 m/s or less, the solution containing one or more of Cu, Hg, Ag, Pb, Cd, Co, Zn, and Ni, having a total concentration of 0.00001% or more and 1.0000% or less, having a pH of −1.5 or more and less than 7, and having a solution temperature of 15° C. or more and 100° C. or less, the time during which the steel sheet is dipped in the solution being 5 seconds or more and 200 seconds or less, wherein at least a portion of Mn in the MnS, MnSe, and MnTe in the grain-oriented electrical steel sheet is substituted for one or more of Cu, Hg, Ag, Pb, Cd, Co, Zn, and Ni, through contact with the solution at the depth of 10 to 500 μm from the surface of the steel sheet.

2. A method for producing grain-oriented electrical steel sheet according to claim 1, wherein in the rapid temperature rise of the primary recrystallization annealing, an average rate of temperature rise in the temperature region of 550° C. to 700° C. is 100° C./s or more and 3000° C./s or less.

3. A method for producing grain-oriented electrical steel sheet according to claim 2, wherein the primary recrystallization annealing includes a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

4. A method for producing grain-oriented electrical steel sheet according to claim 1, wherein the primary recrystallization annealing includes a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

5. A method for producing grain-oriented electrical steel sheet according to claim 1, wherein the shot speed is 50 m/s or more and 150 m/s or less.

6. A method for producing grain-oriented electrical steel sheet comprising a process of heating and hot rolling a slab containing, by mass %, C: 0.01% or more and 0.10% or less, Si: 2.5% or more and 4.5% or less, Mn: 0.01% or more and 0.50% or less, a total of one or more of S, Se, and Te: 0.001% or more and 0.050% or less, acid soluble Al: more than 0% and 0.05% or less, and N: more than 0% and 0.015% or less and having a balance of Fe and impurities to obtain a hot rolled steel sheet or annealing the hot rolled steel sheet to obtain a hot rolled annealed sheet, wherein the slab optionally contains, in place of part of the Fe, one or more of Cu: 1.0% or less, Sn: 1.0% or less, Ni: 1.0% or less, Cr: 1.0% or less, Sb: 1.0% or less, and Bi: 1.0% or less, wherein the grain-oriented electrical steel sheet includes one or more of MnS, MnSe, and MnTe, a process of cold rolling the hot rolled steel sheet or the hot rolled annealed sheet to obtain a cold rolled steel sheet, a process of annealing the cold rolled steel sheet for primary recrystallization to obtain a primary recrystallized annealed sheet, a process of coating a surface of the primary recrystallized annealed sheet with an annealing separator including MgO, then finish annealing it to obtain a finish annealed sheet, and a process of coating the finish annealed sheet with an insulation coating, then annealing it for flattening, at least one steel sheet among the hot rolled steel sheet, the hot rolled annealed sheet, the cold rolled steel sheet, and the primary recrystallized annealed sheet being treated by leveling and treated by contact with a solution, wherein the solution penetrates to a depth of 10 to 500 μm from the surface of the steel sheet, in the leveling treatment, the number of bending operations of the steel sheet being two or more, a bending angle being 10 degrees or more and 90 degrees or less, and a bending radius being 10 mm or more and 200 mm or less, the solution containing one or more of Cu, Hg, Ag, Pb, Cd, Co, Zn, and Ni, having a total concentration of 0.00001% or more and 1.0000% or less, having a pH of −1.5 or more and less than 7, and having a solution temperature of 15° C. or more and 100° C. or less, the time during which the steel sheet is dipped in the solution being 5 seconds or more and 200 seconds or less, wherein at least a portion of Mn in the MnS, MnSe, and MnTe in the grain-oriented electrical steel sheet is substituted for one or more of Cu, Hg, Ag, Pb, Cd, Co, Zn, and Ni, through contact with the solution at a depth of 10 to 500 μm from the surface of the steel sheet.

7. A method for producing grain-oriented electrical steel sheet according to claim 6, wherein in the rapid temperature rise of the primary recrystallization annealing, an average rate of temperature rise in the temperature region of 550° C. to 700° C. is 100° C./s or more and 3000° C./s or less.

8. A method for producing grain-oriented electrical steel sheet according to claim 7, wherein the primary recrystallization annealing includes a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

9. A method for producing grain-oriented electrical steel sheet according to claim 6, wherein the primary recrystallization annealing includes a process of temperature rise, a process of intermediate treatment from temperature rise to decarburization annealing, and a process of decarburization annealing, in the intermediate treatment, a dew point temperature of the atmosphere is −40° C. or more and 0° C. or less and a dwell time at a steel sheet temperature of 700° C. or more and 950° C. or less is 1 second or more and 20 seconds or less, and in the decarburization annealing, an oxygen partial pressure ratio ($P_{H_2O}/P_{H_2}$) of the atmosphere is 0.35 or more and 0.60 or less.

10. A method for producing grain-oriented electrical steel sheet according to claim 6, wherein the bending radius is 100 mm or more and 200 mm or less.

* * * * *